United States Patent [19]

Pfalzgraf et al.

[11] Patent Number: 4,785,224
[45] Date of Patent: Nov. 15, 1988

[54] APPARATUS FOR THE ACTUATION OF A SETTING ELEMENT

[75] Inventors: Manfred Pfalzgraf, Frankfurt am Main; Andreas Wokan, Darmstadt; Kurt Probst, Schwalbach; Bernward Stoll, Frankfurt am Main, all of Fed. Rep. of Germany

[73] Assignee: VDO Adolf Schindling AG, Frankfurt am Main, Fed. Rep. of Germany

[21] Appl. No.: 72,133

[22] Filed: Jul. 10, 1987

[30] Foreign Application Priority Data

Aug. 22, 1986 [DE] Fed. Rep. of Germany ....... 3628535

[51] Int. Cl.⁴ ............................................. G05B 1/06
[52] U.S. Cl. .................................. 318/663; 318/599; 318/687; 123/327
[58] Field of Search ....................... 318/663, 599, 687; 364/431.1; 123/327

[56] References Cited

U.S. PATENT DOCUMENTS 4,295,082 10/1981 Moto et al. ........................ 318/599
4,456,831  6/1984 Kanegae et al. .................. 290/38 R Primary Examiner—William M. Shoop, Jr.
Assistant Examiner—M. Bergmann
Attorney, Agent, or Firm—Martin A. Farber

[57] ABSTRACT

An apparatus for actuation of a setting element has a desired value transmitter and an actual value transmitter for the deflection of the setting element from a rest position. The apparatus includes an electronic controller, particularly for a motor vehicle, wherein the deflection of the setting element is proportional to an electric current fed to the element by the controller. An operating mode of the controller is provided by which a signal emanating from the desired value transmitter is converted into a current proportional to a desired value.

6 Claims, 1 Drawing Sheet

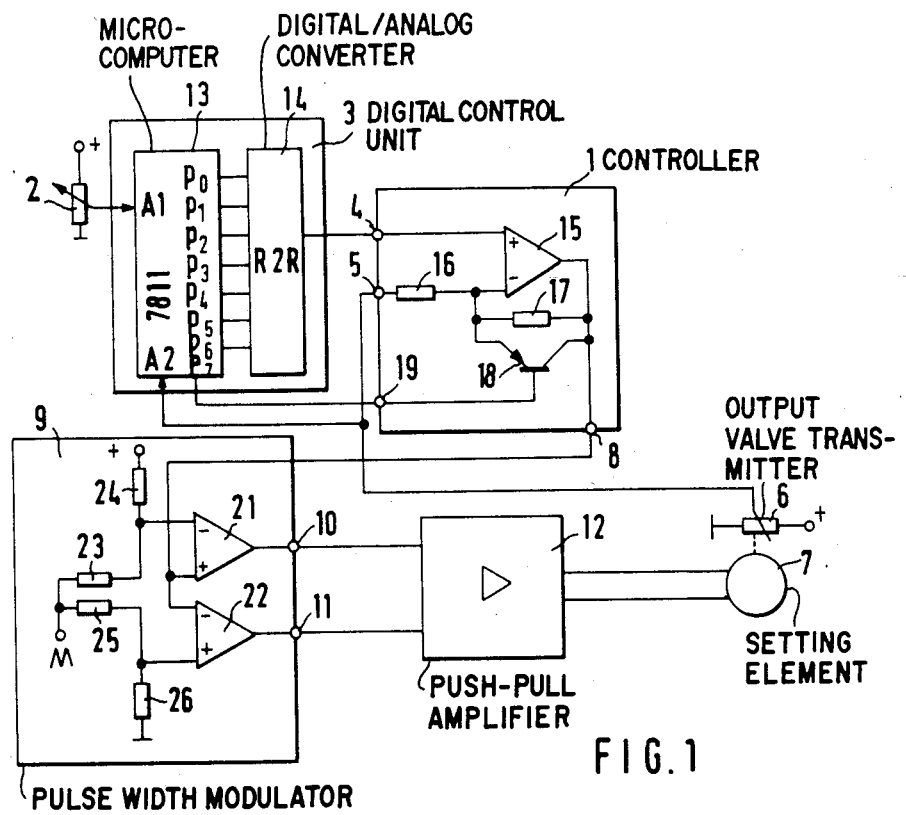
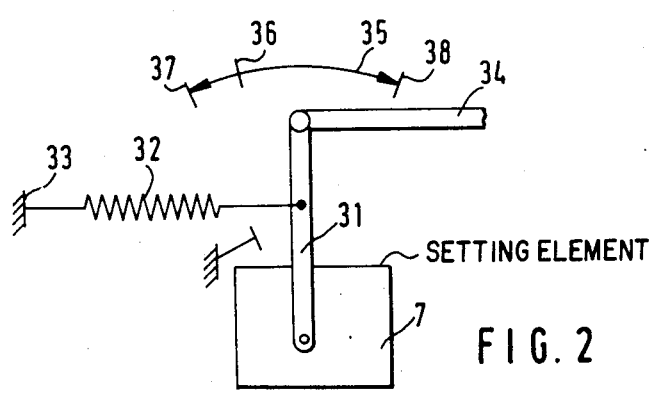

APPARATUS FOR THE ACTUATION OF A SETTING ELEMENT

FIELD AND BACKGROUND OF THE INVENTION

The invention relates to an apparatus for actuation of a setting element particularly for a motor vehicle, and includes a desired value transmitter, an actual value transmitter, and an electric controller for pivoting the setting element from a rest position.

Setting elements, such as for example power controllers of motors of motor vehicles, assume a position which is predetermined by a control system. In general there results a return reply of a position of the element, or of a pivoting of the setting element, to the controller. Upon the occurrence of a disturbance in the reply of the actual value of the pivoting of the setting element, there is generally a failure of the control system.

It is an object of the present invention to provide an apparatus for actuation of a setting element, and upon failure of the reply, to institute an emergency operation.

SUMMARY OF THE INVENTION

Accordingly the invention provides that the deflection of the setting element (7) is proportional to the current fed to it and that a manner of operation of the controller (1) is provided by which a signal emitted from the desired value transmitter (2) is converted into a current which is proportional to the desired value.

Another feature of the invention is that an electronic switch (18) is coordinated with a controller (1), which switch switches over the operational mode of the controller (1). In this manner a simple execution of the apparatus is made possible.

According to a further feature of the present invention a microprocessor (13) is connected between the desired value transmitter (2) and the controller (1). In this way, there is made possible a multiple adjustment or adaptation of the apparatus in accordance with the present invention, to the requirements of various control systems.

An advantageous development of this feature is that a change-over signal is feedable from the microprocessor (13) to the switch (18) when the actual value transmitter (6) or a connection line to the actual value transmitter is defective.

In order to recognize that the defect exists, the actual value is likewise fed to the microcomputer and compared with the desired value. If a large deviation occurs with duration longer than a predetermined time, a defect is assumed.

In a simple circuit implementation of the invention, the controller (1) is formed with a differential amplifier (15) having a noninverting input terminal connected to the desired value signal and an inverting input terminal connected via a resistor (16) with the output of the actual value transmitter (6). Between that between the inverting input and the output of the differential amplifier (15) there is provided a feed-back resistor (17) with a transistor (18) connected in parallel thereto.

Further according to the invention, a pulse width modulator (9) is connected between the output of the differential amplifier (15) and the setting element (7).

The invention permits of various embodiments and features.

BRIEF DESCRIPTION OF THE DRAWING

With the above and other objects and advantages in view, the present invention will become more clearly understood in connection with the detailed description of a preferred embodiment, when considered with the accompanying drawing, of which:

FIG. 1 is a block diagram of an electric circuit in accordance with the present invention; and FIG. 2 schematically shows a setting element which is used in accordance with the present invention.

DETAILED DESCRIPTION OF THE PREFERRED EMBODIMENT

Referring to the drawings, in a circuit according to FIG. 1, a desired value is fed to a controller 1 by a desired value transmitter 2 and a digital control unit 3.

An ouput value transmitter 6 is mechanically connected to the setting element 7 and produces a voltage which is proportional to the deflection of the setting element 7. This voltage is fed also to the controller 1 via an input 5.

An output 8 of the controller 1 is connected to a pulse width modulator 9 on having outputs 10, 11 which provide rectangular pulses whose width is proportional to the voltage at the output 8. In this manner, a pulse occurs at only on one of the outputs 10 or 11 dependent on the polarity of the voltage occurring at the output 8 of the controller 1. The output pulses of the pulse width modulator 9 are fed to the setting element 7 via a push-pull stage 12.

The digital control unit 3 comprises a microcomputer 13 and a digital/analog converter 14. The microcomputer 13 contains among other elements an analog/digitalconverter to which a multiplexer can be connected in series for receipt of several analog values. Thus, the desired value from the desired value transmitter 2 which is formed as a potentiometer, and the actual value from the actual value transmitter 6 are fed to the inputs A1 and A2. The digital control unit 3 is part of a regulating system (not illustrated). For example with the use of the cicuitry of the present invention as an electronic motor power controller (E-gas), different operating parameters of the motor can be evaluated in the digital control unit 3, and the desired value which is fed to the controller 1 can be correspondingly changed. With the illustrated embodiment, the controller 1 comprises essentially a differential amplifier 15, the non-inverting input of which is supplied with the desired value via the input 4 and the inverting input of which is supplied with the actual value via the input 5 and a resistor 16. A feed-back resistor 17 is connected between the inverting input and the output of the differential amplifier 15. The feedback resistor 17 is short circuited by a transistor 18 when a suitable voltage is applied to the control input 19.

If the transistor 18 is conducting, thus the amplification attained between the input 4 and the output 8 of the controller 1 is equal to 1, while the amplification between the input 5 and the output 8 is equal to 0. The voltage at the output 8 is thus independent of the voltage given off from the actual value transmitter 6 but rather is proportional to the desired value fed at the input 4.

The pulse width modulator 9 comprises two differential amplifiers 21, 22, of which in each case respectively a non-inverting input and an inverting input is applied with the output voltage of the controller 1. The remaining inputs of the differential amplifiers 21, 22 are fed by a signal generator 40 with a triangular shaped voltage via a voltage divider of resistors 23, 24 and resistors 25, 26, respectively. Depending upon the polarity and amplitude of the output voltage of the controller 1 there is produced therefore on the outputs 10, 11 of the differential amplifiers 21, 22 pulses of different widths, which introduce a corresponding amount of rotation of a motor of the setting element 7. The motor of the setting element 7 operates, in addition, by cooperation with a defined spring (not shown) to cause a deflection of the setting element 7 which is proportional to the pulse widths.

As example, a particular setting element is illustrated in FIG. 2. By means of an electromotor which produces a torque which is proportional to the current fed to it, a lever like setting element 31 is moved. Suitable for this purpose in an advantageous manner are so-called torque motors. One end of a spring 32 is fastened at the setting element 31, which spring as schematically illustrated is connected by its other end to a fixed point 33. The spring 32 has a defined spring constant so that the deflection of the setting element 31 is proportional to the torque and, thus, to the average value of the applied current pulses.

Moreover a link 34 for the member which is to be adjusted is provided on the setting element 31. This link can, for example, be the throttle valve of a combustion engine. Depending upon the requirements of the individual case, the deflection range which is indicated by the double-headed arrow 35 can be divided such that the spring 32 holds the setting element 31 in a rest position 36 which is between the end positions, when no current is fed. Depending on the polarity of the current, the deflection then occurs in two directions up to the end positions 37, 38. This has the advantage with the control of a combustion engine that, upon absence of the control of the setting element, a starting of the motor is possible.

It is also possible however to provide a zero position at 37 and the end postion at 38, the latter being achievable with maximum current. In this manner then the pulse width modulator 9 (FIG. 1) can be correspondingly simplified.

With an actual desired value transmitter 6 the controller 1 can work as a controller, whereby an exact deflection of the setting element 7 corresponding to the fed desired value is assured. In case of a defect of the actual value transmitter 6 or respectively the line from the actual value transmitter 6 to the input 5 of the controller, the controller 1 can be switched over to a drive mode or operating mode. Thereby the desired value which is fed at 4 can be conducted further directly via the output 8 resulting in a corresponding deflection of the setting element 31 (FIG. 2) or the setting element 7 (FIG. 1) in response to cooperation between the applied current and the return setting force of the spring 32. In order to recognize that the defect exists, the actual value is likewise fed to the microcomputer and compared with the desired value. If a large deviation occurs with duration longer than a predetermined time, a defect is assumed.

While there have been described an embodiment of the invention, this has been described by example only and not in a limiting sense.

We claim:

1. In an apparatus, particularly for a motor vehicle, for actuation of a setting element, the apparatus including a desired value transmitter, an actual value transmitter and an electronic controller responsive to signals of both transmitters for pivoting the setting element from a rest position; and wherein said setting element deflects in proportion to a current fed thereto by the controller, the controller including means for converting a signal emitted from the desired value transmitter into a current which is proportional to the desired value in a bypass mode of operation;

said actual value transmitter is coupled to said setting element for signaling a deflection thereof; said converting means comprising a switch for switching an operating mode of the controller between normal operation, when said actual value transmitter signals said deflection, and said bypass mode, when said actual value transmitter fails to signal said deflection.

2. The apparatus according to claim 1, further comprising a microprocessor connected between the desired value transmitter and the controller for determining the presence of a fault in a circuit of the actual value transmitter.

3. The apparatus according to claim 2, wherein said microprocessor produces a change-over signal which is applied to the switch during the presence of said fault in the circuit of the actual value transmitter.

4. The apparatus according to claim 3, wherein a signal is fed from the actual value transmitter to the microprocessor;

said microprocessor compares said signal from the actual value transmitter with a desired value from the desired value transmitter; and said microprocessor applies said change-over signal to the switch in response to a determination by the microprocessor that said signal from the actual value transmitter has more than a predetermined deviation from the desired value for a duration which is longer than a predetermined time.

5. In an apparatus, particularly for a motor vehicle, for actuation of a setting element, the apparatus including a desired value transmitter, an actual value transmitter and an electronic controller responsive to signals of both transmitters for pivoting the setting element from a rest position; and wherein said setting element deflects in proportion to a current fed thereto by the controller, the controller including means for converting a signal emitted from the desired value transmitter into a current which is proportional to the desired value;

said actual value transmitter is coupled to said setting element for signaling a deflection thereof; said converting means comprising a switch for switching an operating mode of the controller between normal operation, when said actual value transmitter signals said deflection, and a bypass mode, when said actual value transmitter fails to signal said deflection;

a feedback resistor, an input resistor, and a differential amplifier having inverting and noninverting input terminals, the desired value being fed to the noninverting input terminal, and the inverting input being connected via said input resistor with an output of the actual value transmitter; and wherein said feedback resistor is connected between the inverting input terminal and an output of the differential amplifier, the feedback resistor being connected in parallel with said switch, said switch comprising a transistor.

6. The apparatus according to claim 5, wherein said converting means further comprises
a pulse width modulator connected between the output of the differential amplifier and the setting element.

* * * * *